United States Patent
Mussoi et al.

(10) Patent No.: US 8,522,913 B2
(45) Date of Patent: Sep. 3, 2013

(54) TRANSMISSION FOR A WORK MACHINE WITH ATTACHED HYDRAULIC FLUID PUMP

(75) Inventors: Marcelo Mussoi, Moline, IL (US); Dwayne A. Nystrom, Waterloo, IA (US)

(73) Assignee: Deere & Company, Moline, IL (US)

( * ) Notice: Subject to any disclaimer, the term of this patent is extended or adjusted under 35 U.S.C. 154(b) by 96 days.

(21) Appl. No.: 13/002,554

(22) PCT Filed: Jul. 7, 2008

(86) PCT No.: PCT/US2008/008307
§ 371 (c)(1),
(2), (4) Date: Mar. 25, 2011

(87) PCT Pub. No.: WO2010/005410
PCT Pub. Date: Jan. 14, 2010

(65) Prior Publication Data
US 2011/0259450 A1    Oct. 27, 2011

(51) Int. Cl.
*F04B 41/06* (2006.01)
(52) U.S. Cl.
USPC ................ 180/367; 137/565.31; 417/286

(58) Field of Classification Search
USPC ............... 180/367, 337, 165, 53.4; 137/544, 137/565.31, 565.3, 565.29; 417/286
IPC .................................. B60K 17/10; F04B 41/06
See application file for complete search history.

(56) References Cited

U.S. PATENT DOCUMENTS

| | | | | | |
|---|---|---|---|---|---|
| 3,272,559 | A | * | 9/1966 | Haynes | 299/37.1 |
| 5,102,376 | A | * | 4/1992 | Batt | 475/72 |
| 5,819,535 | A | * | 10/1998 | Smothers et al. | 60/454 |
| 6,575,709 | B2 | * | 6/2003 | Howard | 417/286 |
| 7,669,414 | B2 | * | 3/2010 | Loeffler | 60/414 |
| 2004/0200657 | A1 | | 10/2004 | Stoll et al. | |
| 2007/0093352 | A1 | | 4/2007 | Hikada et al. | |
| 2007/0193264 | A1 | | 8/2007 | Dong et al. | |
| 2007/0209983 | A1 | | 9/2007 | Johnson et al. | |

FOREIGN PATENT DOCUMENTS

| | | |
|---|---|---|
| GB | 980918 | 1/1965 |
| WO | WO 2007/108805 A1 * | 9/2007 |
| WO | WO 2008045368 A2 * | 4/2008 |

* cited by examiner

*Primary Examiner* — Keith Frisby

(57) ABSTRACT

A transmission assembly for a work machine (10) includes a transmission (16) having a transmission housing (18), a manifold housing (20) attached to the transmission housing (18), and hydraulic pump (22) configured to be connected to the manifold housing (20).

11 Claims, 5 Drawing Sheets

TRANSMISSION FOR A WORK MACHINE WITH ATTACHED HYDRAULIC FLUID PUMP

FIELD OF THE INVENTION

The present invention relates to work machines, and, more particularly, to transmissions used in such work machines.

BACKGROUND OF THE INVENTION

A work machine such as an agricultural tractor or a construction tractor may include an internal combustion (IC) engine which provides input power to a transmission, which in turn is coupled with and drives the rear axles through a rear end differential. The transmission, rear end differential and rear axles are sometimes referred to as the "rear end" of the work machine.

The tractors have hydraulic systems which include hydraulic pumps which supply pressurized hydraulic fluid to various hydraulically operated devices. These devices include a hitch system, selective control valves (SCV's) connected to hydraulic cylinders, steering, brakes, and a transmission which includes hydraulically controlled valves and a hydraulic lubrication circuit. The hitch system is located at the rear of the vehicle and the SCV are located at the middle and rear of the vehicle. Some of the hydraulic cylinders are used to operate implements connected to the rear of the vehicle.

These hydraulic pumps are typically in the form of gear pumps and are mounted to the engine which provides the power for the pumps. Typically the hydraulic systems include hydraulically operated devices that are a considerable distance from the pumps, requiring each system to be plumbed with a multitude of hoses, piping and fittings which are costly to produce, provide potential leak paths and consume valuable space on the tractor.

What is needed in the art is a tractor with a hydraulic system that is efficient, conserves tractor space and minimizes exposure of hydraulic components.

SUMMARY OF THE INVENTION

The invention in one form is directed to a manifold housing for a work machine. The manifold includes an external surface configured for connection to an external surface of a transmission and a plurality of internal passages. The manifold also includes a plurality of spaced apart ports, each of the plurality of spaced apart ports connected to at least one of the plurality of internal passages.

The invention in another form is directed to a work machine, including an engine and a rear end coupled with the engine. The rear end includes a transmission having a transmission housing, a manifold housing attached to the transmission housing, and a hydraulic pump. The hydraulic pump is configured to be connected to the manifold housing.

DETAILED DESCRIPTION OF THE INVENTION

Figure 1:
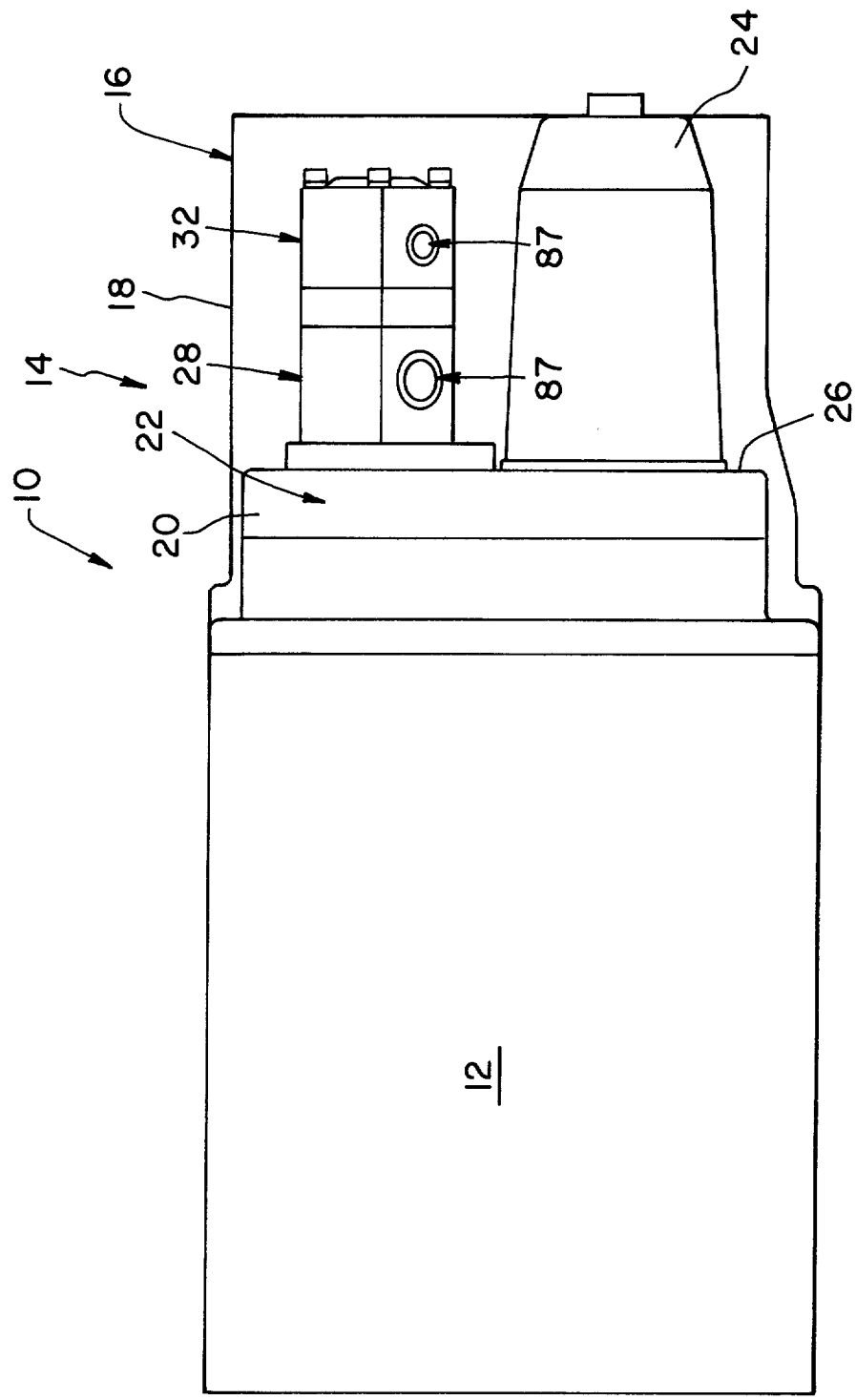
FIG. 1 is a partial plan view of a transmission including an embodiment of a manifold housing of the present invention used in an agricultural tractor.

According to the present invention and referring now to FIG. 1, a work machine 10 is shown. The work machine 10 includes an engine 12 (shown in simplified block form) and a rear end 14 (partially shown) coupled to the engine 12. The work machine 10 may be, for example, in the form of an agricultural tractor or a construction vehicle. The rear end 14 includes a transmission 16 having a transmission housing 18. The rear end also includes a manifold housing 20 attached to the transmission housing 18 and a hydraulic pump 22 connected to the manifold housing 20.

As shown in FIG. 1, the work machine 10 further includes a filter cartridge 24. The filter cartridge 24 is used to filter hydraulic fluid that may become contaminated in the hydraulic fluid systems of the work machine 10. The manifold housing 20, as shown in FIG. 1, includes an external surface 26 for receiving the filter cartridge 24. The filter cartridge 24 includes a housing that cooperates with the external surface 26 of the manifold housing to contain hydraulic fluid therein. The filter cartridge 24 with this configuration does not require a separate filter cap to access the filter within the cartridge. The hydraulic pump 22 of the work machine 10 is an internal hydraulic pump. The internal hydraulic pump 22 is positioned in the manifold housing 20.

The hydraulic pump 22 may supply pressurized hydraulic fluid to various hydraulic operated devices (not shown) such as a brake system, a transmission, a steering system, a hitch system such as a three-point hitch for an agricultural tractor, and selective control valves (SCVs) connected to hydraulic cylinders. The work machine 10 further includes a second hydraulic pump in the form of a proximal hydraulic pump 28 connected to the manifold housing 20 at external surface 30 of manifold housing 20. The work machine 10 further includes a third hydraulic pump in the form of a distal hydraulic pump 32 attached to the proximal external hydraulic pump 28. The proximal hydraulic pump 28 and the distal hydraulic pump 32 may be any type of hydraulic pump and may for example be a vane or a gear pump. Typically, the proximal hydraulic pump 28 and the distal hydraulic pump 32 are gear pumps.

Figure 2:
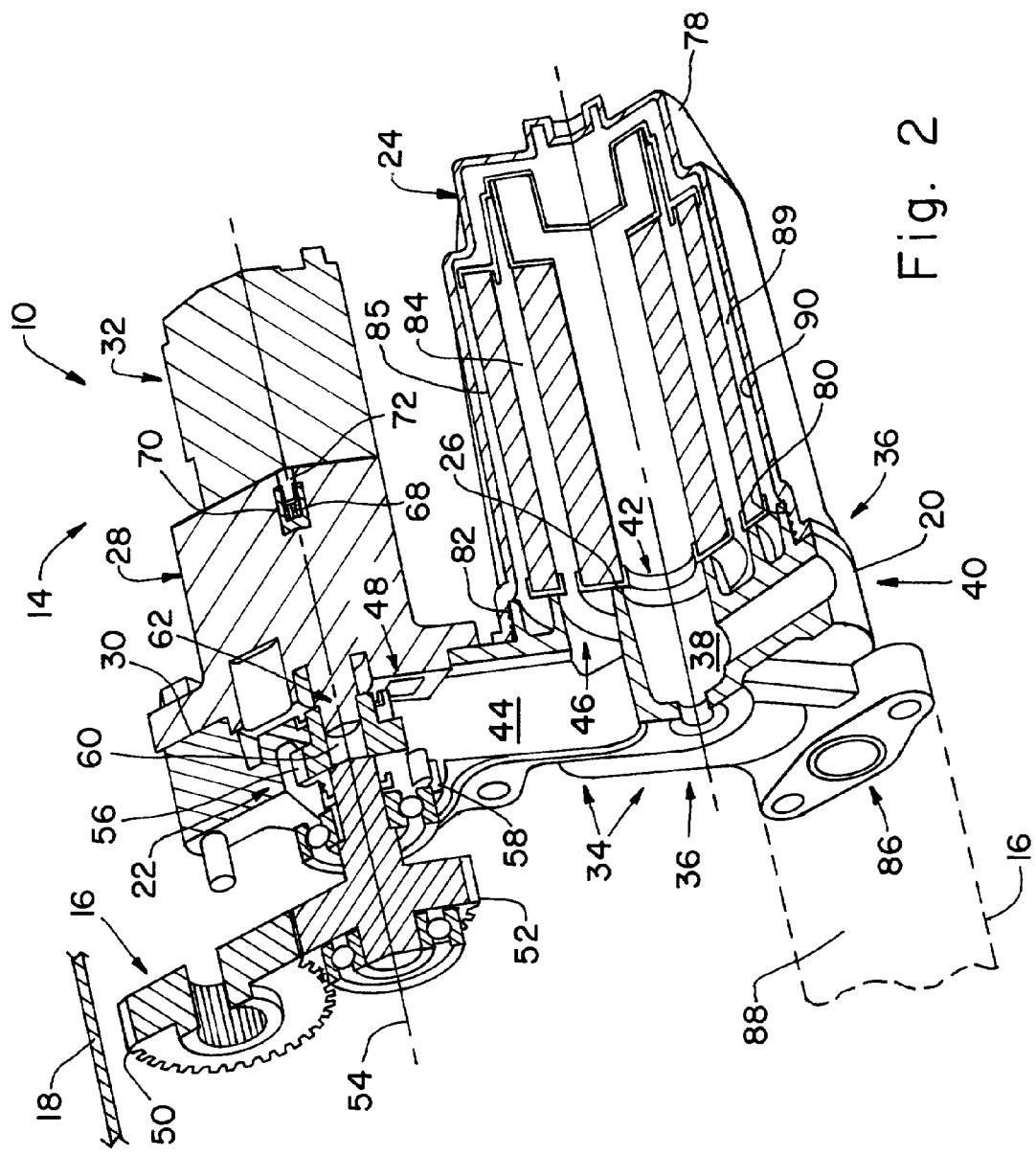
FIG. 2 is a partial perspective view, partially in cross section, of the transmission of FIG. 1.

Referring now to FIG. 2, the manifold housing 20 includes a plurality of internal passages 34 and a plurality of spaced apart external ports 36. Each of the plurality of spaced apart external ports 36 is connected to at least one of the plurality of internal passages 34. The passages 34 and ports 36 serve to direct the flow of hydraulic fluid to and from the pumps 22, 28 and 32 and to and from the filter cartridge 24. For example, and as shown in FIG. 2, the manifold housing 20 includes a first internal passage 38 extending from SCV return port 40 to filter inlet port 42. The manifold housing also includes a second internal passage 44 extending from filter outlet port 46 to internal pump outlet port 48.

As shown in FIG. 2, the internal hydraulic pump 22 is in the form of a gear pump and is located within second internal passage 44 of manifold housing 20. The internal hydraulic pump 22 is driven from the transmission 16. The transmission 16 includes an input gear 50 which drives output gear 52. The output gear 52 rotates along longitudinal axis 54. As shown in FIG. 2, the internal hydraulic pump 22 includes an input or drive gear 56 as well as a driven gear 58. The internal passage 44 serves as a reservoir to contain hydraulic fluid that also serves as direct lubrication of a bearing 59 that supports the drive gear 56 of the internal hydraulic pump 22. A similar bearing (not shown) may support the driven gear 58 of the internal hydraulic pump 22 and may be similarly lubricated. The hydraulic pump input gear 56 therefore rotates about longitudinal axis 54 of the output gear 52 of transmission 16. The use of the internal hydraulic pump 22 provides a hydraulic pump that minimizes space in the rear end 14, as well as, a pump that is located closer to the need for hydraulic power, for example, the transmission 16.

Further, and as is shown in FIG. 2, the internal hydraulic pump 22 also serves to transfer power from the transmission 16 to the proximal hydraulic pump 28. The drive gear 56 of the internal hydraulic pump 22 includes an internal spline 60 that mates with input shaft 62 of the proximal hydraulic pump 28. The input shaft 62, thus, also rotates about longitudinal axis 54 of the output gear 52 of the transmission 16. As such, the internal hydraulic pump as serves as the coupler between the shaft on the output gear 52 of transmission 16 and the input shaft 62 of the proximal hydraulic pump 28. The dual use of the internal pump 22 as a pump and as a coupler saves space and cost.

As shown in FIG. 2, the rear end 14 further includes the third pump or distal external pump 32. The distal external pump 32 is mounted to proximal external pump 28. The proximal hydraulic pump 28 includes an internal spline 68 that mates with an external spline 70 on input shaft 72 of the distal pump 68. The distal external pump 32 and the proximal external pump 28 may be used to provide pressurized hydraulic fluid to one or more of the hydraulic operated devices such as the brake system, the transmission, the steering system, the hitch system, and the SCVs. Since at least the hitch system, and the SCVs are rearwardly located on the tractor, the position of the pumps 28 and 32 in a more rearward location than prior pumps that are mounted to the engine, results in a tractor with fewer and shorter hydraulic hoses and piping and fewer hydraulic fittings.

Figure 3:
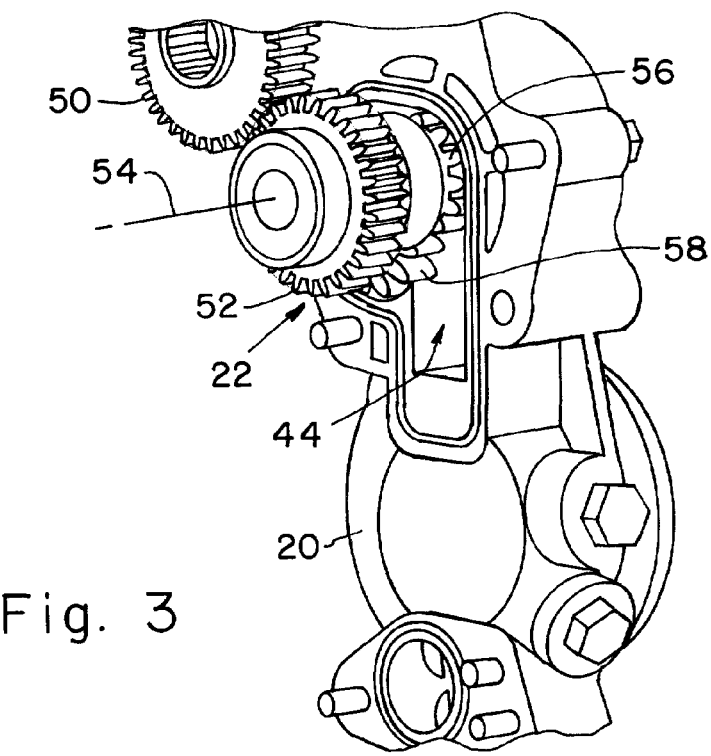
FIG. 3 is a partial perspective view of the transmission of FIG. 1, showing pump gears for an internal hydraulic pump housed in the manifold housing.
Figure 4:
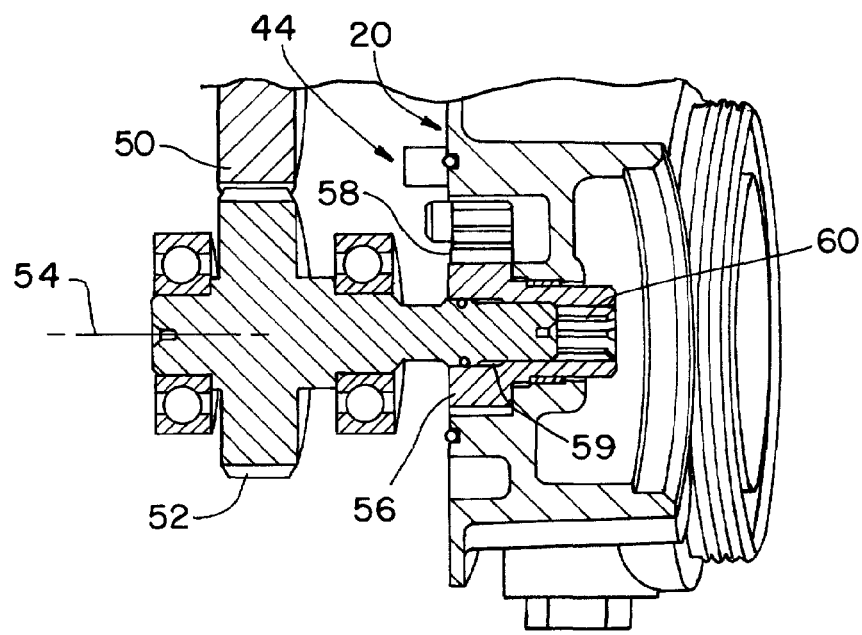
FIG. 4 is a partial perspective view, partially in cross section, of the transmission of FIG. 1 showing the transmission output gear in greater detail.
Figure 5:
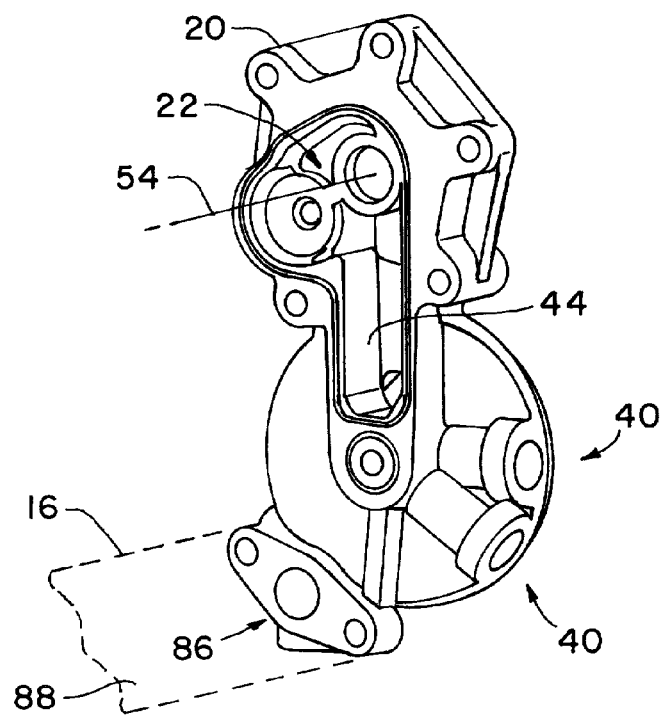
FIG. 5 is a perspective view, of the manifold housing the transmission of FIG. 1 showing the front of the manifold housing in greater detail.
Figure 6:
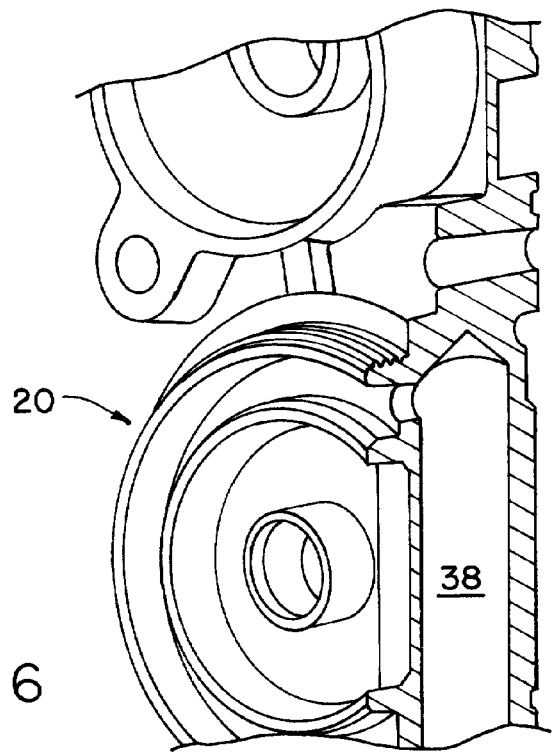
FIG. 6 is a perspective view, partially in cross section, of the manifold housing the transmission of FIG. 1 showing a connection for a filter cartridge in greater detail.
Figure 7:
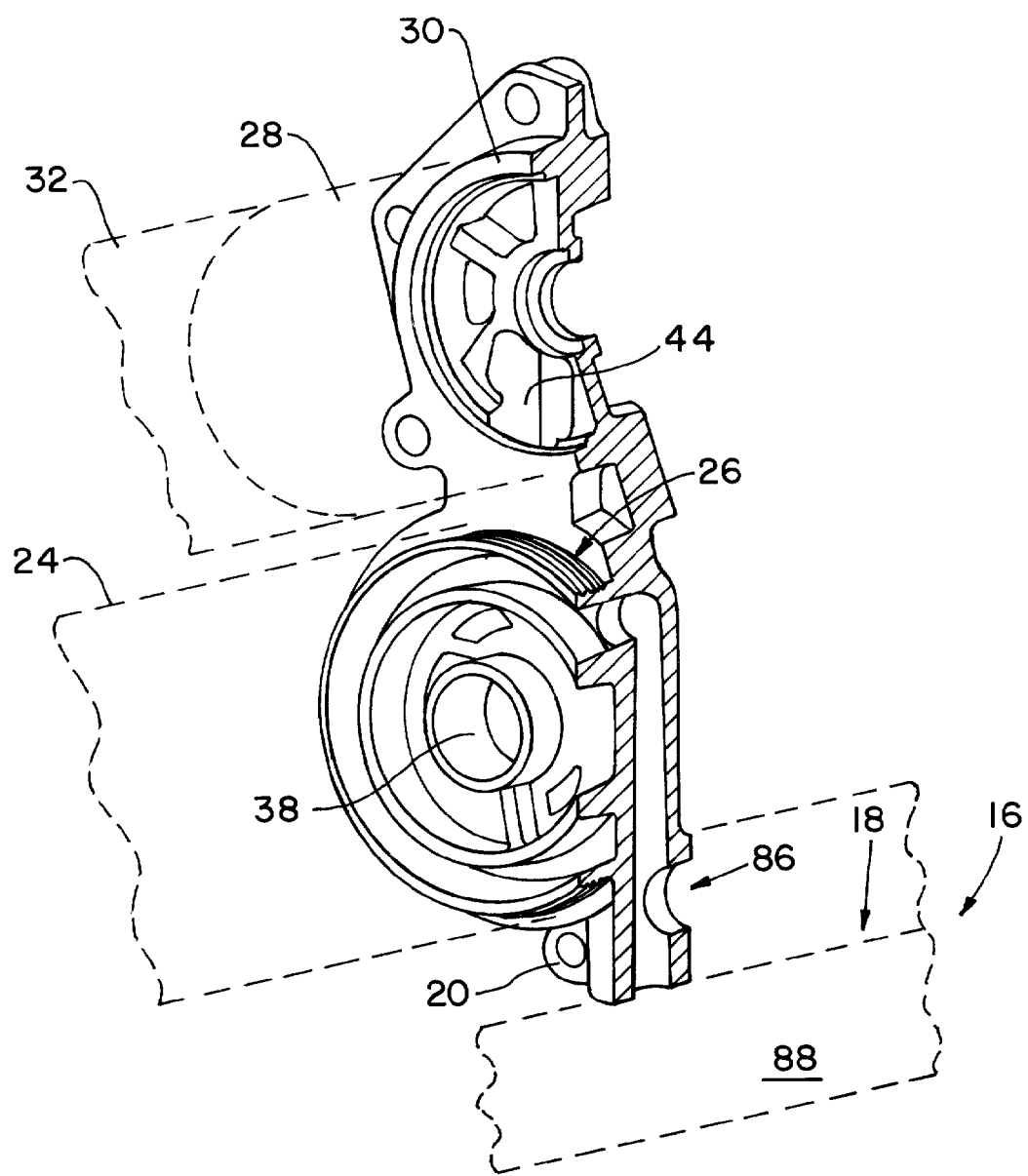
FIG. 7 is a perspective view, of the manifold housing the transmission of FIG. 5 showing the rear of the manifold housing in greater detail.

Referring now to FIGS. 3, 4 and 5, the pump drive gear 56 and the pump driven gear 58 are shown positioned in internal passage 44 of the manifold housing 20 to form internal hydraulic pump 22. The internal hydraulic pump 22 is connected to proximal hydraulic pump 28 by internal passages which, in turn is connected to distal hydraulic pump 32 by internal passages. The hydraulic pumps 22, 28 and 32 thus use a common inlet. The common inlet of the three hydraulic pumps 22, 28 and 32 provides the pumps to be hydraulically interconnected. The three hydraulic pumps 22, 28 and 32 utilize a common suction consisting of the internal passages and, therefore, do not require external plumbing to provide suction. No external suction plumbing on the three hydraulic pumps 22, 28 and 32 reduces parts and opportunity for leaks, as well as, saves space and cost. As such all the hydraulic pumps 22, 28 and 32 help each other concerning priming of the pumps. The common inlet permits all the hydraulic pumps 22, 28 and 32 to be connected to a common sump 88. Further, the fluid in these pumps 22, 28 and 32 may be filtered by the same filter, namely filter cartridge 24. This pump configuration is also very compact, using less tractor space and fewer and simple components than previous designs.

Referring again to FIG. 2, the filter cartridge 24 is shown in greater detail. As shown in FIG. 2 the filter cartridge 24 includes a housing 78 which defines internal threads 80 for mating with external threads 82 formed on the manifold housing 20. The filter cartridge 24 further includes a return filter element 84 and a suction filter element 85. Hydraulic fluid for the three pumps 22, 28 and 32 is supplied through filter cartridge 24 from sump port 86 of sump 88 within the transmission 16. The hydraulic fluid from the sump 88 passes through sump port 86, into passage 89 between inner wall 90 of filter cartridge 24 and return filter element 84, through return filter element 84, through port 46, and into second internal passage 44 of the manifold housing 20.

Returned hydraulic fluid from implement hydraulic cylinders and the like passes from SCV return port 40, through internal passage 38, to filter inlet port 42, through return filter element 84 of filter cartridge 24, through filter outlet port 46, and to second internal passage 44 of the manifold housing 20. The SCV return port 40 is positioned on the readily accessible exterior of the manifold housing 20. Similarly, ports on the proximal hydraulic pump 28 and the distal hydraulic pump 32 are positioned on the readily accessible exterior of the pumps 28 and 32. The location of the SCV return port 40 and the ports of pumps 28 and 32 provides geometry that avoids complicated hydraulic fittings including ninety degree bend fittings and "T" connectors that may be necessary with prior art engine mounting of hydraulic pumps. Hydraulic fluid for the three pumps 22, 28 and 32 is thus supplied from the sump 88 and from the SCV return port 40. The filter cartridge 24 filters both fluid to the pumps 22, 28 and 32 supplied from the SCV return port 40 and fluid to the pumps 22, 28 and 32 supplied from the sump 88.

The filter cartridge 24 is mounted on the manifold housing 20 and the manifold housing 20 is mounted on the transmission 16. The manifold housing 20 includes the sump port 86 for fluid communication with sump 88 within the transmission 16. When the transmission 16 is not operating, the fluid within will drain through sump port 86 to sump 88 within the transmission housing 18. The filter cartridge 24 is so positioned relative to the transmission 16, the manifold housing 20, and the sump 88 such that, when the transmission is not operating, at least most of the hydraulic fluid within the filter cartridge 24 will flow from the filter cartridge 24 through the manifold housing 20 to the sump 88, so that the filter cartridge 24 may be removed and replaced, cleanly and efficiently.

Referring now to FIGS. 2, 5, 6 and 7, the ports and passage that provide paths for the fluid from the manifold housing 20, the filter cartridge 24, and the sump 88 are shown in greater detail. When the engine 12 of the work machine 10 is not running, the transmission 16 is not rotating and the pumps 22, 28 and 32 are not turning. When the pumps 22, 28 and 32 are not turning, the fluid is not longer pressurized and the fluid drains by gravity. The filter cartridge 24 is positioned horizontally, permitting fluid within the cartridge 24 to drain into the manifold housing 20. Fluid within the manifold housing may drain into the sump 88. The drain from the pumps 22, 28 and 32 to the manifold housing 20 and from the cartridge 24 to the manifold housing 20 have a flow generally the reverse of the flow described above while the pumps 22, 28 and 32 are turning. The filter cartridge 24 drains when the pumps are not turning and may then be removed and replaced.

Having described the preferred embodiment, it will become apparent that various modifications can be made without departing from the scope of the invention as defined in the accompanying claims.

What is claimed is:

1. A transmission assembly for a work machine, comprising:
   a transmission including a transmission housing;
   a manifold housing attached to the transmission housing; and
   first and second hydraulic pumps configured to be connected to the manifold housing, wherein the first pump includes an input shaft having an axis of rotation thereof; wherein the second pump includes an input shaft having an axis of rotation thereof; and wherein the axis of rotation of the first pump and the axis of rotation the second pump are coincident and wherein said first hydraulic pump includes at least two gears positioned within said manifold housing.

2. The transmission assembly of claim 1, wherein said manifold housing includes a plurality of internal passages and a plurality of spaced apart ports, each of the plurality of spaced apart ports connected to at least one of the plurality of internal passages.

3. The transmission assembly of claim 1:
   further comprising a filter cartridge; and
   wherein said manifold housing includes an external surface for receiving said filter cartridge.

4. The transmission assembly of claim 3, wherein the filter cartridge includes an integral housing, the housing and the external surface of the manifold housing cooperating to enclose hydraulic fluid within the cartridge.

5. The transmission assembly of claim 3, wherein the filter cartridge is configured to be fluidly connected to the transmission and configured to be positioned relative to the transmission such that substantially all the hydraulic fluid within the filter cartridge may be drained into the transmission by gravity when the transmission is not in operation.

6. The transmission assembly of claim 1, wherein said manifold housing includes an external surface for receiving said hydraulic pump.

7. The transmission assembly of claim 1, wherein said first mentioned hydraulic pump and said second hydraulic pump are configured to receive hydraulic fluid from a common inlet.

8. The transmission assembly of claim 1, wherein the second hydraulic pump is attached to said first mentioned hydraulic pump.

9. The transmission assembly of claim 1, wherein at least a portion of the hydraulic pump is positioned with said manifold housing.

10. The transmission assembly of claim 1:
    further comprising a bearing for supporting one of the gears; and
    wherein said bearing is configured to be lubricated by hydraulic fluid within said manifold housing.

11. The transmission assembly of claim 1, wherein said manifold housing includes at least one selective control valve return port on an external periphery thereof.

* * * * *